United States Patent

[11] 3,583,547

| [72] | Inventor | Paul H. Dixon<br>Belvidere, Ill. |
|---|---|---|
| [21] | Appl. No. | 773,860 |
| [22] | Filed | Nov. 6, 1968 |
| [45] | Patented | June 8, 1971 |
| [73] | Assignee | Dixon Automatic Tool, Inc.<br>Rockford, Ill. |

[54] MACHINE FOR FEEDING AND ORIENTING WORKPIECES
11 Claims, 15 Drawing Figs.

[52] U.S. Cl. .................................................. 198/33, 221/160
[51] Int. Cl. .................................................. B65g 47/24
[50] Field of Search........................................... 198/33.1 R, 25; 221/157, 160, 162, 164

[56] References Cited
UNITED STATES PATENTS

| 233,062 | 10/1880 | Barlow........................... | 221/160 |
| 553,803 | 1/1896 | Bennett.......................... | 221/164 |
| 2,803,377 | 8/1957 | Wilson ........................... | 221/160 |
| 3,258,106 | 6/1966 | Booth............................. | 198/33 (R1) |
| 3,260,347 | 7/1966 | Barnes............................ | 198/33 (R1) |

*Primary Examiner*—Richard E. Aegerter
*Attorney*—Wolfe, Hubbard, Leydig, Voit & Osann ABSTRACT: Randomly disposed screws having dissimilar opposite ends are oriented with their identical ends facing in the same direction by a rotatable selector wheel which is located between two vibratory track sections of a workpiece feeder. The screws advance from a supply hopper along the first track section by vibratory action and are fed into the selector wheel which discards misarranged screws back into the hopper while carrying properly arranged screws around to the second track section for continued vibratory advancement. In one embodiment, the track sections are spiraled around a vibratory bowl and, in a second embodiment, the track sections are aligned with one another in a downwardly inclined plane.

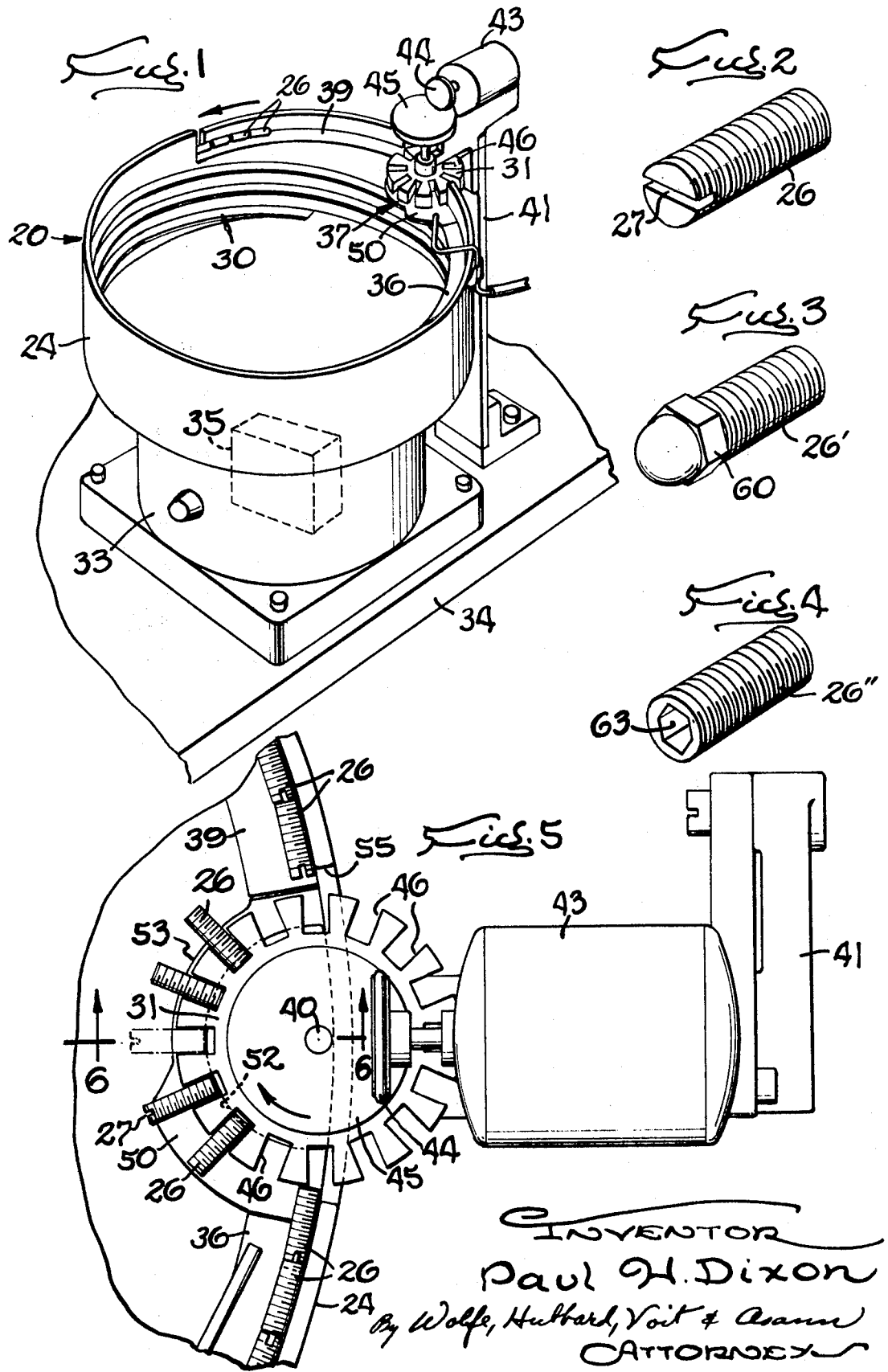

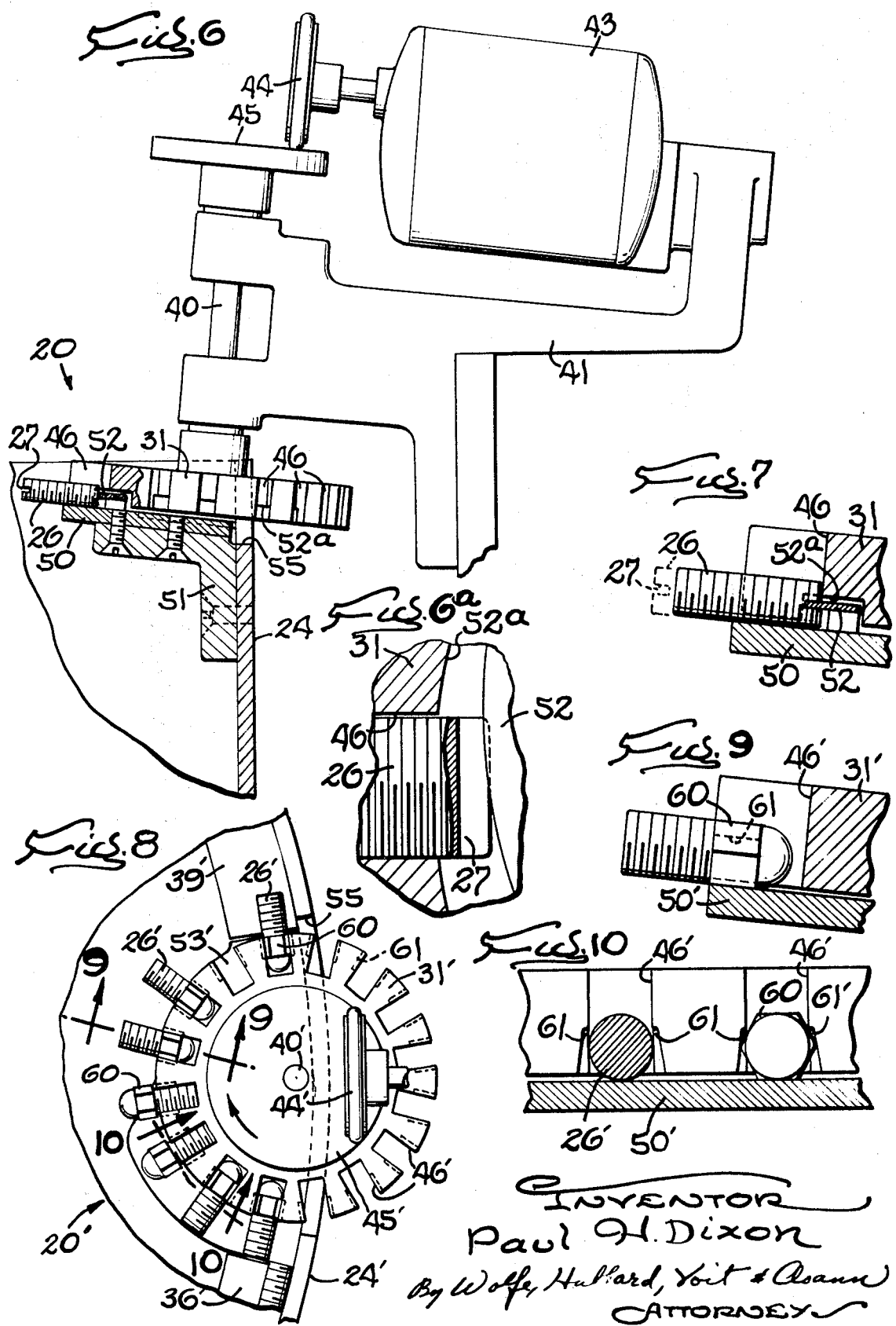

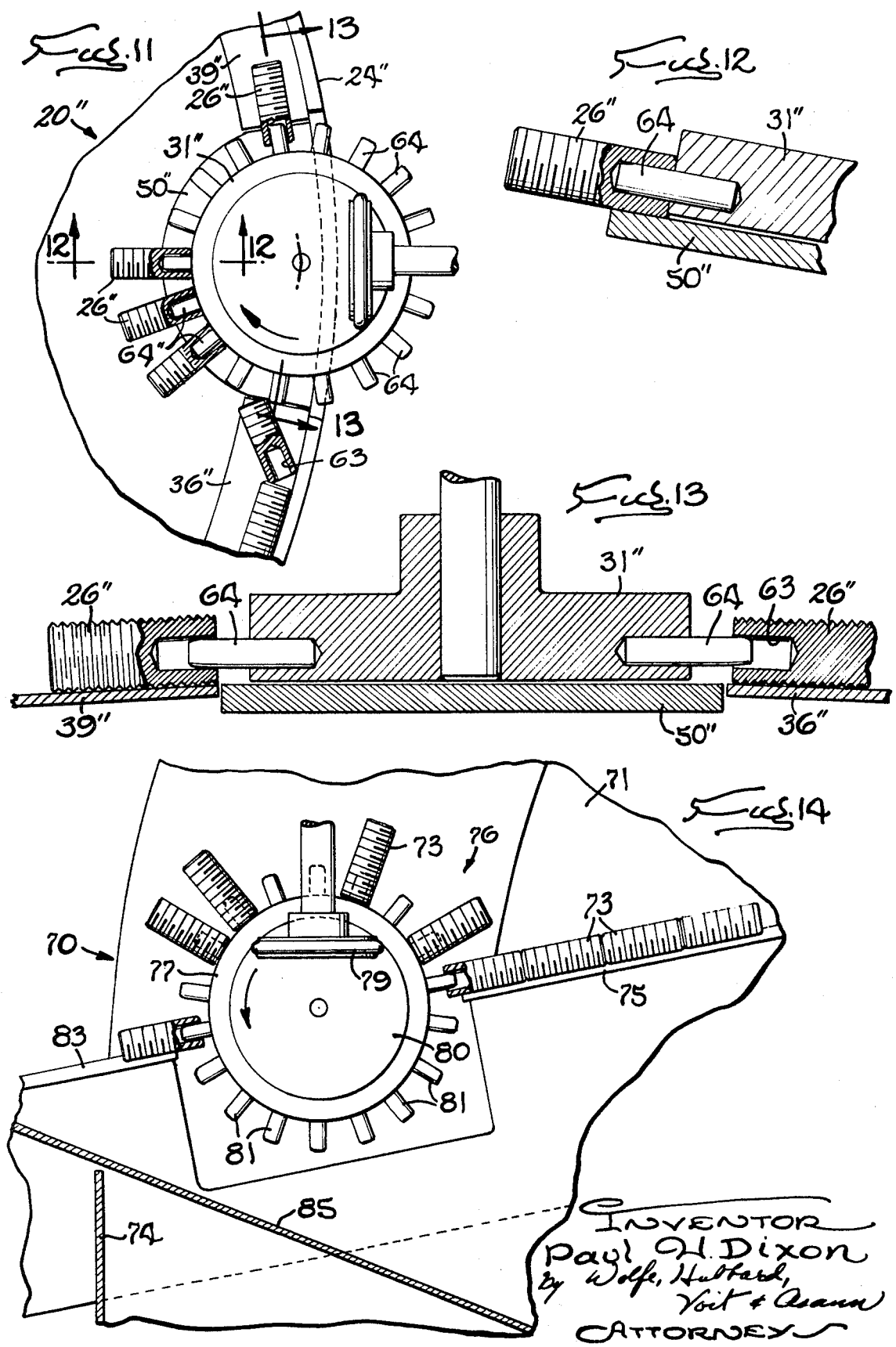

MACHINE FOR FEEDING AND ORIENTING WORKPIECES

BACKGROUND OF THE INVENTION

This invention relates to a machine for feeding elongated workpieces having opposite ends with different physical characteristics and for orienting and arranging the workpieces such that all are positioned with similar ends facing in the same direction. More particularly, the invention has reference to a machine of the type in which randomly disposed workpieces in a supply hopper are advanced endwise along a vibratory track and then are delivered to an operating station in identically oriented positions.

SUMMARY OF THE INVENTION

The primary aim of the present invention is to simplify the construction and operation of a machine of the above character by orienting the workpieces as they are advanced along the vibratory track and by turning properly arranged workpieces end-for-end at an orienting station on the track itself while discarding misarranged workpieces back into the supply hopper. An important object of the invention is to use the vibratory motion of the track to assist in transferring the workpieces into and out of the orienting station.

In a more detailed sense, the invention contemplates dividing the track into two sections which are separated by a unique selector wheel operable to discard improperly arranged workpieces and to carry properly arranged workpieces from one section to the other while turning the workpieces end-for-end. The vibratory motion of the track is utilized to feed the workpieces into and out of the wheel automatically as an incident to the advancement of the workpieces along the track.

The invention also resides in the novel coaction between the wheel and the track to keep the workpieces advancing smoothly and rapidly, and in the unique construction of the wheel to enable the handling of widely varying types of workpieces.

Other objects and advantages of the invention will become apparent from the following detailed description when taken in conjunction with the accompanying drawings.

BRIEF DESCRIPTION OF THE DRAWINGS

FIG. 1 is a fragmentary perspective view of one embodiment of a new and improved workpiece feeding and orienting machine embodying the novel features of the present invention.

FIGS. 2 to 4 are perspective views of different types of exemplary workpieces adapted to be handled by machines incorporating the features of the invention.

FIG. 5 is an enlarged fragmentary plan view of parts shown in FIG. 1.

FIG. 6 is a fragmentary cross section taken substantially along the line 6–6 of FIG. 5.

FIGS. 6a and 7 are enlarged views of parts shown in FIG. 6.

FIG. 8 is a fragmentary plan view similar to FIG. 5 but showing the machine modified to handle a different type of workpiece.

FIG. 9 is an enlarged fragmentary cross section taken substantially along the line 9–9 of FIG. 8.

FIG. 10 is an enlarged fragmentary cross section taken substantially along the line 10–10 of FIG. 8.

FIG. 11 is a fragmentary plan view similar to FIG. 8 but showing the machine modified to handle still a different type of workpiece.

FIG. 12 is an enlarged fragmentary cross section taken substantially along the line 12–12 of FIG. 11.

FIG. 13 is an enlarged fragmentary cross section taken substantially along the line 13–13 of FIG. 11.

FIG. 14 is a fragmentary elevational view of a second embodiment of a new and improved workpiece feeding and orienting machine incorporating the features of the invention, parts of the machine being broken away and shown in section.

DETAILED DESCRIPTION OF THE PREFERRED EMBODIMENTS

As shown in the drawings for purposes of illustration, the invention is embodied in a machine 20 for feeding randomly disposed workpieces from a supply hopper 24 and for orienting the workpieces into identical positions before they are delivered to an operating station where an assembly operation or the like is performed on the workpieces by an automatic assembling device (not shown). Solely to demonstrate the principles of operation of the machine, the exemplary workpiece illustrated in FIG. 2 is shown as being a set screw 26 whose one end is formed with a screwdriver slot 27. The screws are delivered from the hopper to the assembling device in endwise relation along a vibratory track 30 (FIG. 1) and initially are arranged indiscriminately such that the slots 27 of some screws face in one direction while the slots of other screws face in the opposite direction. All of the screws must be delivered to the assembling device with similar ends facing in the same direction (the screws herein being delivered to the assembling device slot-last) and thus it is necessary that the screws be oriented in an identical manner before reaching the assembly device.

According to the primary aspect of the present invention, the vibratory track 30 is interrupted with a unique selector wheel 31 which properly orients the screws 26 as they are advanced endwise along the track by discarding misarranged screws back into the supply hopper 24 and by turning correctly arranged screws end-for-end for continued advancement to the assembling device. Moreover, advantage is taken of the vibratory motion of the track to transfer the screws to and from the wheel automatically as the screws advance along the track. The construction and operation of the machine 20 thus are simplified since the screws are oriented within the machine itself without being diverted to a station remote from the track and since there is no need for specialized transfer apparatus for delivering the screws to and from the selector wheel.

In the embodiment of the invention shown in FIG. 1, the supply hopper 24 is in the form of an upwardly opening bowl which is supported on a pedestal 33 on a base 34 and which is oscillated radially at a frequency such as 3600 vibrations per minute by a power-driven vibratory unit 35 (shown schematically in FIG. 1) housed within the pedestal. The track 30 is wound spirally around the inner wall of the bowl 24 and, as the latter is vibrated, screws 26 within the bowl are picked up automatically on the track and are drive upwardly along the spiral in end-to-end relation. Preferably, the track is located in a plane which is inclined downwardly toward the adjacent wall of the bowl to keep the screws lying along the wall during their advancement and to prevent the screws from dropping off of the inner edge of the track.

In carrying out the invention, the track 30 is formed as two sections, namely, a lower section 36 (FIGS. 1 and 5) which herein spirals upwardly from the bottom of the bowl 24 to an orienting station 37, and an upper delivery section 39 which preferably but not necessarily spirals downwardly from the orienting station and outwardly of the bowl to the operating station where the assembly device is located. The selector wheel 31 is located in the orienting station 37 between the two tracks sections 36 and 39 and serves to arrange the screws 26 such that all screws transferred to the delivery section proceed along such section slot-last as required by the assembling device. Herein, the wheel is simply a flat disc which is fast on the lower end of an upright shaft 40 (FIG. 6). The latter is journaled by a supporting frame 41 on the base 34 and in this specific instance is power-rotated by a small electric motor 43 which also is supported on the frame. The motor drives a circular disc 44 which frictionally engages a similar disc 45 on the shaft 40 to rotate the wheel in a clockwise direction as viewed in FIG. 5.

Formed in and spaced angularly around the outer periphery of the wheel 31 is a series of workpiece holders which, in the first embodiment, are in the form of sockets 46 (FIGS. 5 and 7) for telescopically receiving the screws 26 advancing along the lower track section 36, the sockets opening out of the periphery of the wheel and also out of its upper and lower faces. The screws are held in the sockets by an inclined retaining plate 50 (FIGS. 5 and 6) underlying the wheel in the plane of and between the ends of the track sections 36 and 39 and fastened by a bracket 51 to the wall of the bowl 24 so as to vibrate with the latter. A curved bladelike strip 52 which is sized and shaped to fit into the slots 27 in the screws is fastened to the upper side of the retaining plate and is disposed in an arcuate undercut section 52a (FIG. 7) formed in and around the lower side of the wheel. As shown most clearly in FIGS. 5 and 7, the strip 52 is located near the closed ends of the sockets 46, extends around the plate 50 from the lower track section 36 to the delivery track section 39, and projects or spirals outwardly progressively greater distances from the closed ends of the sockets as it proceeds around the plate. The strip forms a simulated screwdriver blade for detecting whether or not the screws are inserted into the sockets slot-first.

With the foregoing arrangement, one of the screws 26 advances automatically into one of the sockets 46 as the screws are vibrated and driven endwise from the bowl 24 to the wheel 31 along the lower track 36. The wheel then carries the screws across the plate 50 and over the interior of the bowl toward the delivery track section 39, the screws being revolved about their own axes during such rotation as a result of their contact with the plate. As the screws are carried across the plate, the initial portion of the bladelike strip 52 catches a corner of the slot 27 of each screw inserted slot-first into its socket to stop the revolving motion of the screw (see FIG. 6a) and, as the screw continues around the plate, the outwardly spiraled strip cams the screw to a position in which the full length of the slot is aligned with and received by the strip. The screw thus is permitted to seat fully in the socket with its inner end abutting directly against the closed end of the socket as shown in full lines in FIG. 7. Those screws which enter the sockets slot-last are not received by the strip, however, and abut directly against the strip rather than against the closed ends of the sockets. These screws thus project a greater distance out of the sockets (as shown in phantom in FIG. 7) than those screws whose slots are received by the strip.

A shown in FIG. 5, the retaining plate 50 extends outwardly well beyond the periphery of the wheel 31 adjacent the end of the lower track section 36 but is reduced in width, as indicated at 53, as it approaches the end of the delivery section 39. Accordingly, when the wheel is rotated clockwise to carry the screws 26 across the plate, those screws inserted slot-last in the sockets 46 overhang the narrow portion 53 of the plate to a considerable degree since the strip 52 prevents the screws from seating fully within the sockets. Accordingly, such screws drop off of the edge of the narrow portion by virtue of their own weight and fall back into the bowl.

Those screws 26 inserted slot-first in the sockets 46 are retained therein, however, since, with the strip 52 receiving the slots 27, the extent that the screws overhang the narrow portion 53 of the plate 50 is not sufficient to permit the screws to become unbalanced and drop off of the plate. Thus, such screws are carried around in the sockets to the delivery track section 39 where they are removed automatically from the sockets by virtue of the vibratory action of the delivery section 39 and the plate 50. In being carried around with the wheel 31, the screws are turned end-for-end and thus are transferred to the delivery section with their slotted ends in proper trailing relation.

As shown in FIG. 6, the selector wheel 31 is inclined downwardly in a plane parallel to that of the track 30 and the plate 50 and is fitted partially into a notch 55 formed in the wall of the bowl 24. As a result, the screws 26 are fed to and from the wheel in a smooth manner, and the wheel advantageously may be disposed partially within and partially outside of the bowl so as to be positioned near the wall of the bowl in overlying relation with the track.

From the foregoing, it will be apparent that the screws 26 are oriented properly and turned end-for-end as they are advanced along the track 30 from the bowl 24 to the assembling device and hence do not have to be diverted to a separate orienting station located substantially out of the normal line of advance. The bowl-type feeding machine 20 itself thus is capable of both feeding and orienting the screws. Because the vibratory action of the track is used to transfer the screws to and from the wheel 31, mechanical transfer elements are not required and thus the machine is comparatively simple in construction and operation. The spiraled strip 52 cams those screws which are inserted slot-first in the sockets 46 into positions in which the slots 27 are received by the strip. Thus, the strip in effect seeks out the slots of the revolving screws and is effective to seat in the slots even though the latter may be slightly offcenter with respect to the screws.

Shown in FIGS. 8 to 10 is a machine 20' which is adapted to orient screws 26' (FIG. 3) having one end formed with an enlarged head such as a hexagon head 60. Parts of the machine 20' corresponding to those of the machine 20 are indicated by the same but primed reference numerals.

In this instance, the lower ends of the sockets 46' of the wheel 31' are notched out as shown in FIG. 10 to form shoulders 61 for engaging the upper sides of the heads 60 when the screws 26' are inserted head-first into the sockets (see the right-hand screw in FIG. 10). These screws thus are prevented from tipping out of the sockets by the shoulders, are turned end-for-end upon being carried around to the delivery section 39' by the wheel 31', and are transferred head-last to the delivery section for advancement to the assembling device.

If, however, a screw 26' advancing along the lower section 36' enters the socket 46' head-last, the smaller diameter threaded end of the screw clears the retaining shoulders 61 (see the left-hand screw in FIG. 10). Accordingly, the screw tips out of the socket and falls off of the plate 50' and back into the bowl 24' upon being carried across the narrow portion 53' of the plate. The machine may be changed over from handling the screws 26 to handling the screws 26' simply by replacing the wheel 31 with the wheel 31' and, if necessary, by replacing the plate 50 with the plate 50' to compensate for any differences in the length and weight of the screws.

Still another machine 20" as shown in FIGS. 11 to 13 in which parts corresponding to those of the other two embodiments are indicated by the same but doubled-primed reference numerals. The machine 20" is particularly adapted to orient screws 26" (FIG. 4) having one end formed with an internal recess 63.

Herein, the workpiece holders on the wheel 31" are in the form of a series of angularly spaced pins 64 projecting radially from the periphery of the wheel and sized to fit into the recesses 63 in the screws 26". Each screw advancing recess-first along the lower track section 36" telescopes automatically into one of the pins 64 and is turned end-for-end for automatic removal at the delivery track section 39". Those screws advancing recess-last along the lower track section simply engage the ends of the pins and are kicked off of the lower section and back into the bowl 24" as the wheel rotates. A plate 50" may be fastened to the bowl in underlying relation with the wheel to held support the screws.

The principles of the invention are applicable to a so-called straight-line feeder 70 shown in FIG. 14 as well as to the bowl-type feeders of the previous embodiments. The feeder 70 is similar to that shown in U.S. Pat. No. 3,346,095 and includes generally a rotating drum 71 which scoops up workpieces, herein shown as recessed screws 73, from a supply hopper 74 and drops the screws onto an upstream vibratory track section 75 for advancement to an orienting station 76 where an orienting wheel 77 is driven about a generally horizontal axis by friction discs 79 and 80. The wheel 77 is similar to the wheel 31" and includes pins 81 for telescoping with the recesses in the screws. Spaced from the upstream track section 75 and located on the diametrically opposite side of the wheel is a vibratory downstream track section 83 which advances the screws to the assembling device. The downstream section is aligned in a straight line with the upstream section and both may be oscillated endwise by a single vibratory unit (not shown).

Screws 73 advancing recess-first down the upstream track section 75 are picked up by the pins 81 and are carried around to the downstream track section 83. Those screws proceeding recess-last down the downstream section simply are kicked off of the latter section by the revolving pins and are directed back into the hopper 74 through a return chute 85 underlying the wheel 77.

It will be apparent from the foregoing that the new and improved selector wheel of the present invention may be used to handle widely varying types of workpieces and may be employed in conjunction with different types of parts feeders. In each case, properly arranged workpieces are turned end-for-end and allowed to continue along the vibratory track while improperly arranged workpieces are rejected back into the supply hopper.

I claim:

1. In a machine for feeding and orienting workpieces having first and second end portions with different characteristics, the combination of, an upwardly opening bowl for holding the workpieces, a vibratory track spiraled around the inner wall of the bowl, said track having a first vibrating section with a conveying surface for advancing the workpieces upwardly and endwise from the bottom of said bowl to an orienting station and having a second vibrating section with a conveying surface for advancing the workpieces from said orienting station to an operating station, a selector wheel located in said orienting station between said track sections and having a series of workpiece holders spaced angularly around its periphery, said wheel being turnable about an upright axis and being disposed in a plane generally parallel to the conveying surfaces adjacent the orienting station, the upper end of said bowl being formed with a notch for receiving said wheel with the latter being located partially within and partially outside of said bowl, said wheel being rotatable in said orienting station with each of said holders first moving past said first track section into position to receive a workpiece being vibrated along such section and then moving past said second track section in order to carry the workpiece around to and release the workpiece on the latter section for vibration toward the operating station, and said holders being shaped to discriminate between the different characteristics of the end portions of the workpieces to discard back into the bowl those workpieces advancing along the first section second-end-first and to carry around to the second section only those workpieces being advanced first-end-first along the first section.

2. A machine as defined in claim 1 in which said track is interrupted with said first section being spiraled upwardly within said bowl, said second track section being spaced from said first section and spiraling downwardly within said bowl and out of the wall thereof.

3. A machine as defined in claim 1 in which said wheel and said track sections are inclined downwardly at a slight angle toward the adjacent wall of the bowl thereby to retain the workpieces alongside said wall when the workpieces are on said track sections.

4. A machine as defined in claim 1 in which said wheel is rotated in such a direction to move each holder past said first track section, over the interior of said bowl, past said second track section, and then around the outside of said bowl to said first track section.

5. In a machine for feeding and orienting workpieces having first and second end portions with different characteristics, the combination of, an upwardly opening bowl for holding the workpieces, a vibratory track spiraled around the inner wall of the bowl, said track having a first vibrating section with a conveying surface for advancing the workpieces upwardly and endwise from the bottom of said bowl to an orienting station, said track including a second vibrating section spaced from said first section and having a conveying surface for advancing the workpieces from said orienting station to an operating station, a selector wheel located in said orienting station between the ends of said track sections, said wheel being turnable about an upright axis and being disposed in a plane generally parallel to the conveying surfaces adjacent the orienting station, the upper end of said bowl being formed with a notch for receiving said wheel with the latter being located partially within and partially outside of said bowl, a series of angularly spaced workpiece-receiving sockets formed in the periphery of the wheel and opening out of both the periphery of the wheel and the lower face of the wheel, said wheel being rotatable in said orienting station with each of said sockets first moving past the end of said first track section into position to receive a workpiece being vibrated along such section, then moving over the interior of said bowl, and then moving past the end of the second track section in order to carry the workpiece around to the latter section for vibration toward the operating station, a nonrotatable plate located between the ends of said track sections and underlying said wheel to support the undersides of the workpieces being carried in said sockets, and said sockets being shaped to retain those workpieces inserted into the sockets first-end-first and to carry such workpieces across said plate to said second track section and being shaped to allow those workpieces inserted second-end-first to drop off of an edge of the plate and into said bowl after first carrying such workpieces past the end of the first track section and before carrying the workpieces to the second track section.

6. A machine as defined in claim 5 in which said plate is connected to vibrate with said track sections.

7. A machine as defined in claim 5 in which said sockets are shaped to receive those workpieces inserted into the sockets first-end-first to a greater extent than those inserted into the sockets second-end-first whereby the latter workpieces overhand said plate to a greater extent than the former workpieces and drop off of the plate by virtue of their own weight.

8. A machine as defined in claim 5 for feeding and orienting workpieces having first end portions with distinctive axially opening slots and having second end portions without such slots, and further including a blade located at the closed end of each socket and sized and shaped to fit into the slot of a workpiece inserted first-end-first into the socket, and said blades being positioned to abut the ends of workpieces inserted second-end-first and to cause such workpieces to project out of the sockets and to overhand said plate to a greater extent than workpieces inserted first-end-first.

9. A machine as defined in claim 5 for feeding and orienting workpieces having first end portions with distinctive heads and having second end portions without such heads, said sockets being shaped to engage said heads and retain those workpieces inserted first-end-first and being shaped to allow those workpieces inserted second-end-first to drip out of the sockets and off of said plate.

10. In a machine for feeding and orienting workpieces having first end portions with distinctive axially opening slots and having second end portions without such slots, the combination of, a supply hopper for holding the workpieces, a vibratory track having a first vibrating section with a conveying surface for advancing the workpieces endwise from said hopper to an orienting station and having a second vibrating section with a conveying surface for advancing the workpieces from said orienting station toward an operating station, a selector wheel located in said orienting station to turn about an upright axis and being disposed in a plane generally parallel to the conveying surfaces adjacent the orienting station, a series of workpiece-receiving sockets spaced angularly around the periphery of the wheel and opening out of both the periphery of the wheel and the lower face of the wheel, said wheel being rotatable in said orienting station with each of said sockets first moving past said first track section into position to receive a workpiece being vibrated along such section and then moving past said second track section, a plate disposed between said sections and underlying said wheel to support the workpieces as the latter are carried from said first section by said wheel, and blade means located adjacent the inner closed ends of said sockets and sized and shaped to fit into the slots of workpieces inserted first-end-first into the sockets, said blade means being positioned to abut the ends of workpieces inserted second-end-first into the sockets and to cause such workpieces to project out of the sockets and to overhang said plate to a greater extent than workpieces inserted first-end-first whereby those workpieces inserted first-end-first are carried around on said plate to said second track section while those workpieces inserted second-end-first drop off the edge of the plate and into said hopper.

11. A machine as defined in claim 10 in which said blade means comprises a curved blade anchored to said plate, said blade being located beneath the path followed by the sockets as the latter move from said first track section to said second track section, at least part of said blade spiraling outwardly toward the outer ends of said sockets as the blade progresses from said first track section to said second track section.